United States Patent
Golding et al.

(10) Patent No.: US 8,351,057 B2
(45) Date of Patent: Jan. 8, 2013

(54) SELF-POWERED USER INTERFACE PROVIDING ASSEMBLY INSTRUCTIONS

(75) Inventors: Michael P. Golding, Hertfordshire (GB); Anthony J. Peters, Hertfordshire (GB); David K. Halden, Hertfordshire (GB); Andrew C. Pat, Hertfordshire (GB)

(73) Assignee: Xerox Corporation, Norwalk, CT (US)

( * ) Notice: Subject to any disclaimer, the term of this patent is extended or adjusted under 35 U.S.C. 154(b) by 502 days.

(21) Appl. No.: 12/726,555

(22) Filed: Mar. 18, 2010

(65) Prior Publication Data

US 2011/0228302 A1    Sep. 22, 2011

(51) Int. Cl.
    *G06F 15/00* (2006.01)
    *G06F 3/12* (2006.01)
    *G06K 1/00* (2006.01)
(52) U.S. Cl. .......................................... 358/1.13; 358/1.1
(58) Field of Classification Search .................. None
    See application file for complete search history.

(56) References Cited

U.S. PATENT DOCUMENTS

| | | | |
|---|---|---|---|
| 7,324,081 B2 | 1/2008 | Friedrich et al. | |
| 2002/0055798 A1 | 5/2002 | Haye | |
| 2008/0100570 A1 | 5/2008 | Friedrich et al. | |
| 2009/0257207 A1 | 10/2009 | Wang et al. | |
| 2011/0037777 A1* | 2/2011 | Lindahl et al. | 345/619 |

FOREIGN PATENT DOCUMENTS

| | | |
|---|---|---|
| DE | 10239831 A1 | 11/2004 |
| EP | 1 065 603 A2 | 3/2001 |
| JP | 2006318166 | 11/2006 |
| JP | 2008155296 | 7/2008 |
| JP | 2008203922 | 9/2008 |

* cited by examiner

*Primary Examiner* — Douglas Tran
(74) *Attorney, Agent, or Firm* — Gibb & Riley, LLC

(57) ABSTRACT

An apparatus comprises a housing and at least one functional component operating on power from an external power source. The functional component is connectable to the housing. In addition, a graphic user interface assembly is connectable to the housing. The graphic user interface assembly comprises a dedicated power supply used exclusively by the graphic user interface assembly. The graphic user interface assembly displays instructions explaining how to connect the functional component and the graphic user interface assembly to the housing prior to when the functional component is connected to the external power source.

20 Claims, 3 Drawing Sheets

SELF-POWERED USER INTERFACE PROVIDING ASSEMBLY INSTRUCTIONS

BACKGROUND AND SUMMARY

Embodiments herein generally relate to devices that need to be assembled after delivery from the manufacturing facility, and more particularly to devices that contain graphic user interfaces that provide assembly instructions.

A number of product platforms now feature modules that are intended to be shipped as units separate from the main machine. As a result of this strategy, products can be installed further down the supply chain, possibly by a concessionaire before delivery, or by a rigger at a customer site, or even by the customer themselves. By enabling a customer install, installation by more experienced operators is also supported.

The concept of customer assembly poses significant challenges. The install should be quick, easy, simple, and intuitive. To support this, great care is taken during the hardware design and in the design of supporting materials. These supporting materials may take the form of low tack labeling providing install instructions, installation sheets, and packaging designs that optimize the process for the user.

Many devices already feature multi-media capable user interfaces (some in color) that could be utilized to provide assembly instructions to end users. However, with current configurations the user interface only operates after the machine has been assembled, which prevents the user interface from being used to provide assembly instructions. Following any assembly, users will typically power on the machine and will follow user interface installation wizards to set up the machine for use; however, this does not help the user actually assemble a machine.

In order to address these issues, the embodiments herein provide a self-contained modular user interface "pod" containing its own power source. This interface pod is capable of displaying assembly instructions. On-screen assembly directions instruct users in the initial stages of installation (using, for example, a looped animation), before the main power is connected and communications with the rest of the machine takes over to continue installation and finalize setup.

More specifically, one generalized embodiment herein is an apparatus that comprises a housing, and at least one functional component operating on power from an external power source. The functional component is connectable to the housing. In addition, a graphic user interface assembly is connectable to the housing. The graphic user interface assembly comprises a dedicated power supply used exclusively by the graphic user interface assembly. The graphic user interface assembly displays assembly instructions explaining how to connect the functional component and the graphic user interface assembly to the housing in, for example, a video loop format. Because the graphic user interface assembly is self-powered by the dedicated power supply, it can provide the assembly instructions immediately upon being removed from the packing material, allowing the user to view the assembly instructions prior to connecting the housing to its power supply.

The graphic user interface assembly comprises a graphic user interface assembly housing, and the dedicated power supply is maintained within or on the graphic user interface assembly housing. The dedicated power supply is adapted to provide power to the graphic user interface while the functional component is disconnected from the external power source. The external power source comprises an alternating current power supply such as that supplied by power utility companies, and the dedicated power supply comprises a direct current power supply, such as a battery.

In a more detailed example, the graphic user interface assembly comprises logic circuitry, a display screen operatively connected to (directly or indirectly connected to) the logic circuitry, at least one input device (keypad, touch screen, etc.) operatively connected to the logic circuitry, a computerized memory storage operatively connected to the logic circuitry, and the dedicated power supply that is used exclusively by the graphic user interface assembly. The computerized memory storage maintains the assembly instructions used for assembling the apparatus. Such instructions are displayed on the display screen prior to when the functional component is connected to the external power source, and when the graphic user interface assembly is powered by the dedicated power supply.

In one embodiment, the apparatus can comprise a multi-function printing device. Such a device comprises a printer body housing having at least one printing engine that operates on an external power source. Further, the printing device includes at least one accessory component (such as a scanner) that operates on the power from the external power source. The accessory component is connectable to the printer body housing, as is the graphic user interface assembly. The graphic user interface assembly again includes a dedicated battery that is used exclusively by the graphic user interface assembly. As with the previously described embodiments, the graphic user interface assembly displays instructions explaining how to connect the accessory component and the graphic user interface assembly to the printer body housing prior to the accessory component is connected to the external power source.

Further embodiments herein include a container that comprises a sealed outer package having a top that can be opened. Protective packaging materials are maintained within the sealed outer package. The housing that is mentioned above is positioned within the protective packaging materials, as is at least one functional component. The protective packaging materials help prevent the housing and functional components from being damaged during shipment of the container. Again, the functional component operates on power from an external power source after being removed from the sealed outer package. The functional component is connectable to the housing after being removed from the sealed outer package.

In addition, a graphic user interface assembly and printed instructions are positioned adjacent the openable top of the sealed outer package (also within the protective packaging materials) such that the graphic user interface is the first item to be removed from the openable top of the sealed outer package. As in the previous embodiments, the graphic user interface is connectable to the housing after it is removed from the sealed outer package, and the graphic user interface assembly comprises a dedicated power supply used exclusively by the graphic user interface assembly, and After being removed from the sealed outer package the graphic user interface assembly displays instructions explaining how to remove the functional component from the sealed outer package and how to connect the functional component and the graphic user interface assembly to the housing prior to when the functional component is connected to the external power source.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, the concept of customer assembly of devices shipped partially assembled poses significant challenges. The assembly/installation should be quick, easy, simple, and intuitive. The embodiments herein provide easier and quicker user assembly by leveraging the capabilities of the user interfaces (that are included as part of the machine being assembled). The embodiments herein modify the graphic user interface that would normally be included with the device into a self contained modular user interface "pod" or module containing its own power source. The user interface is capable of displaying an animation on screen that can be used to instruct users in the initial stages of assembly, before the main power is connected.

With embodiments herein, the user, having received delivery of their device, would open/remove the outer packaging. The first item to be removed from the container is the self-powered user interface. Printed materials included within the packaging encourage users to turn on the pod user interface at which point the user interface automatically runs a step-by-step style display of assembly instructions directing the user on each step in the assembly process.

These initial assembly instructions are provided using the user interface's own internal power supply (which can be a standard small battery pack). The user interface includes easily made connections (e.g., snap connections) to the housing of the machine. Through simple plug & play (via USB) connections, the user interface begins to communicate with the rest of the machine as the assembly progresses.

The animation presented on the user interface module covers the removal of any remaining packaging, the installation of any peripheral modules, installation of the pod user interface itself (on to the machine) and finally instructions on how to connect the power and turn on the device. Once the main power is enabled, the remaining portions of the device take over the user interface and begin further set-up wizards to enable set-up for full machine functionality (preferences, network, authentication, accounting, etc).

Figure 1:
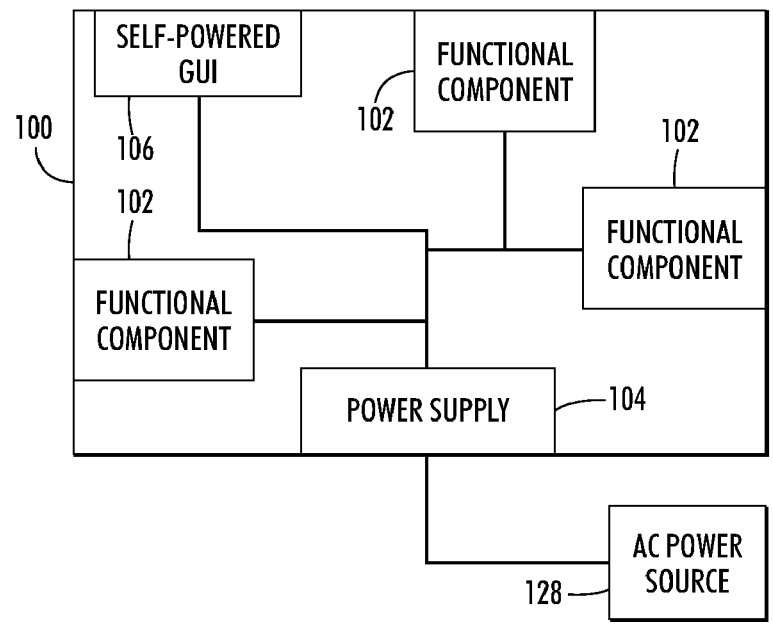
FIG. 1 is a side-view schematic diagram of a device according to embodiments herein.

One generalized embodiment is shown in FIG. 1. More specifically, in FIG. 1 an apparatus comprises a housing 100, and one or more functional components 102 operating on power from an external power source 128. At least one of the functional components 102 is connectable to the housing 100.

In addition, a self-powered pod graphic user interface assembly 106 is connectable to the housing 100. The self-powered graphic user interface assembly 106 comprises a dedicated power supply 148 (shown in FIG. 2) used exclusively by the self-powered graphic user interface assembly 106. The self-powered graphic user interface assembly 106 displays (in an audio/video loop format, for example) animated/recorded assembly instructions explaining how to connect the functional components 102 and the self-powered graphic user interface assembly 106 to the housing 100.

Because the graphic user interface assembly 106 is self-powered by the dedicated power supply 148, it can provide the assembly instructions immediately upon being removed from the packing material, allowing the user to view the assembly instructions prior to connecting the housing 100 to its power supply.

Figure 2:
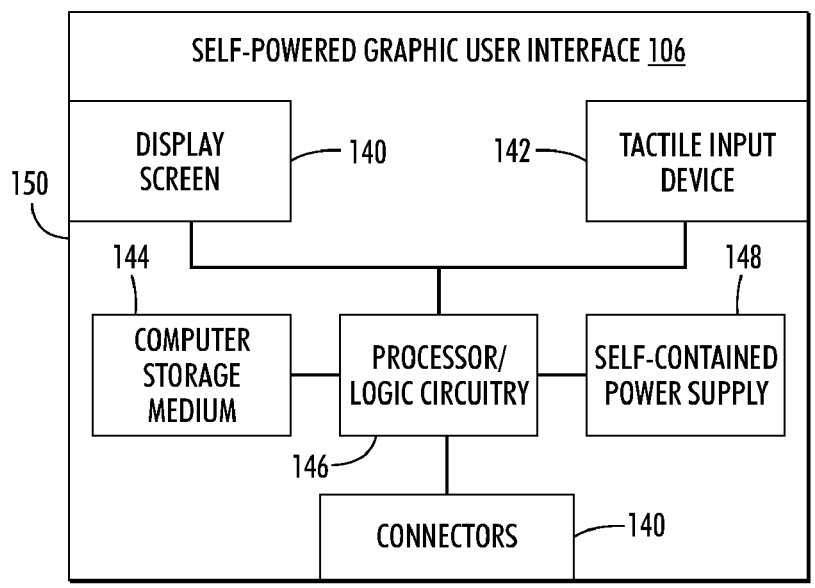
FIG. 2 is a side-view schematic diagram of a graphic user interface according to embodiments herein.

As shown in greater detail in FIG. 2, the self-powered graphic user interface assembly 106 comprises a graphic user interface assembly housing 150, and the dedicated power supply 148 is maintained within or on the self-powered graphic user interface assembly housing 150. The dedicated power supply 148 can comprise one or more batteries that are insertable into the graphic user interface 106.

The dedicated power supply 148 is adapted to provide power to the self-powered graphic user interface while the functional components 102 are still disconnected from the external power source 128. The external power source 128 comprises an alternating current power supply (e.g., 110 v, 220 v, etc.) such as that supplied by power utility companies, and the dedicated power supply 148 comprises direct current power supply, such as solar cells, batteries (1.5 v, 9 v, 12 v, 24, etc.), etc. Any batteries used can comprise any form of energy storage device whether currently known or developed in the future and can include, for example, capacitor based batteries, lead acid batteries, nickel cadmium batteries, lithium ion batteries, etc.

As shown in FIG. 2, the self-powered graphic user interface assembly 106 comprises a processor or logic circuitry 146, a display screen 140 operatively connected to (directly or indirectly connected to) the logic circuitry, at least one input device 142 (keypad, touch screen, pointing device, etc.) operatively connected to the logic circuitry 146, a computerized memory storage 144 operatively connected to the logic circuitry 146, and the dedicated power supply 148 that is used exclusively by the self-powered graphic user interface assembly 106. The computerized memory storage 144 maintains the assembly instructions used for assembling the apparatus 100. Such instructions are displayed on the display screen 140 prior to when the functional components 102 is connected to the external power source 128, and when the self-powered graphic user interface assembly 106 is powered by the dedicated power supply 148.

Figure 3:
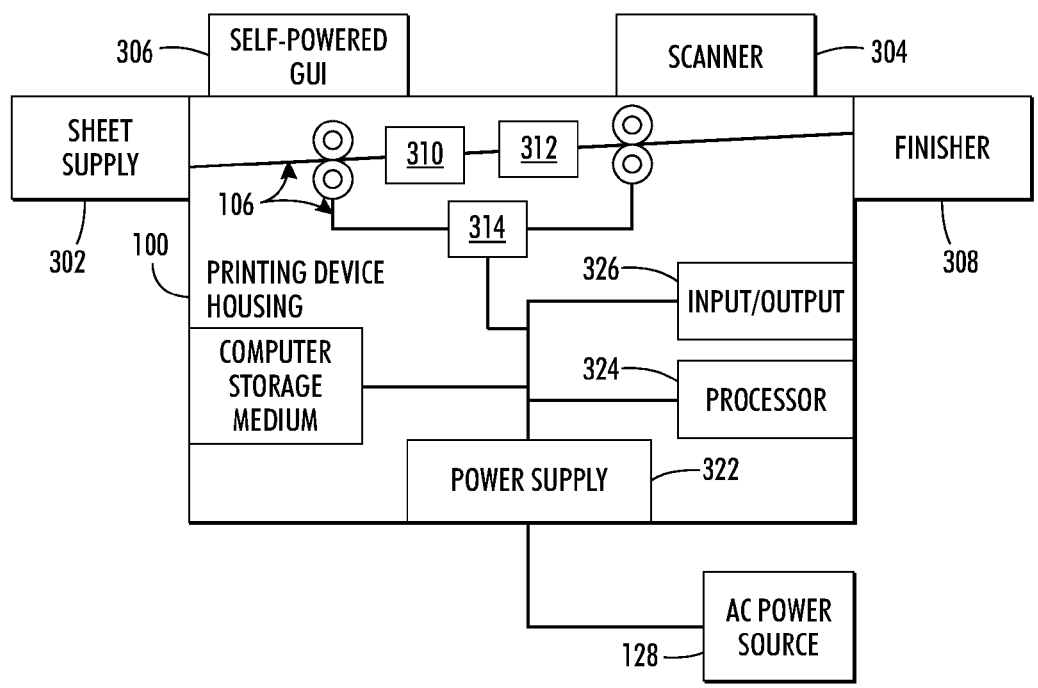
FIG. 3 is a side-view schematic diagram of a device according to embodiments herein.

In one example, the apparatus can comprise a multi-function printing device, such as that illustrating FIG. 3. Such a device comprises a printer body housing 300 having one or more functional components such as printing engines 310, 312, 314 that operate on the external power source 128. Further, the printing device includes at least one accessory functional component (such as a scanner 304, sheet supply 302, finisher 308, etc.) that operate on the power from the external power source 128. The accessory components maybe shipped separately from the printer body housing 300, but are connectable to the printer body housing 300 (as is the self-powered graphic user interface assembly 306).

Once assembled, in the multi-function printing device shown in FIG. 3, sheets of media are supplied from a sheet supply 302 along a paper path 316 to the various printing engines 310, 312, 314. After receiving various markings from the printing engines 310, 312, 314, the sheets of media pass to a finisher 308 which can fold, staple, sort, etc., the various printed sheets. An input/output device 326 is used for communications to and from the multi function printing device 300. A processor 324 controls the various actions of the printing device. A computer storage medium 320 (which can be optical, magnetic, capacitor based, etc.) is readable by the processor 324 and stores instructions that the processor 324 executes to allow the multi-function printing device to perform its various functions. The power supply 322 connects to an external alternating current power source 128 and converts the external power into the type of power needed by the various devices mentioned above.

The self-powered graphic user interface assembly 306 is similar to that shown in FIG. 2, and again includes a dedicated battery that is used exclusively by the self-powered graphic user interface assembly 306. As with the previously described embodiments, the self-powered graphic user interface assembly 306 displays instructions explaining how to connect any of the accessory components (302, 304, 308, 310, 312, 314, 320, 322, 324, 326, etc.) that need to be connected to the housing 300. The self-powered graphic user interface assembly 306 can also be connected to the printer body housing 300 prior to the accessory components being connected to the external power source 128.

Figure 4:
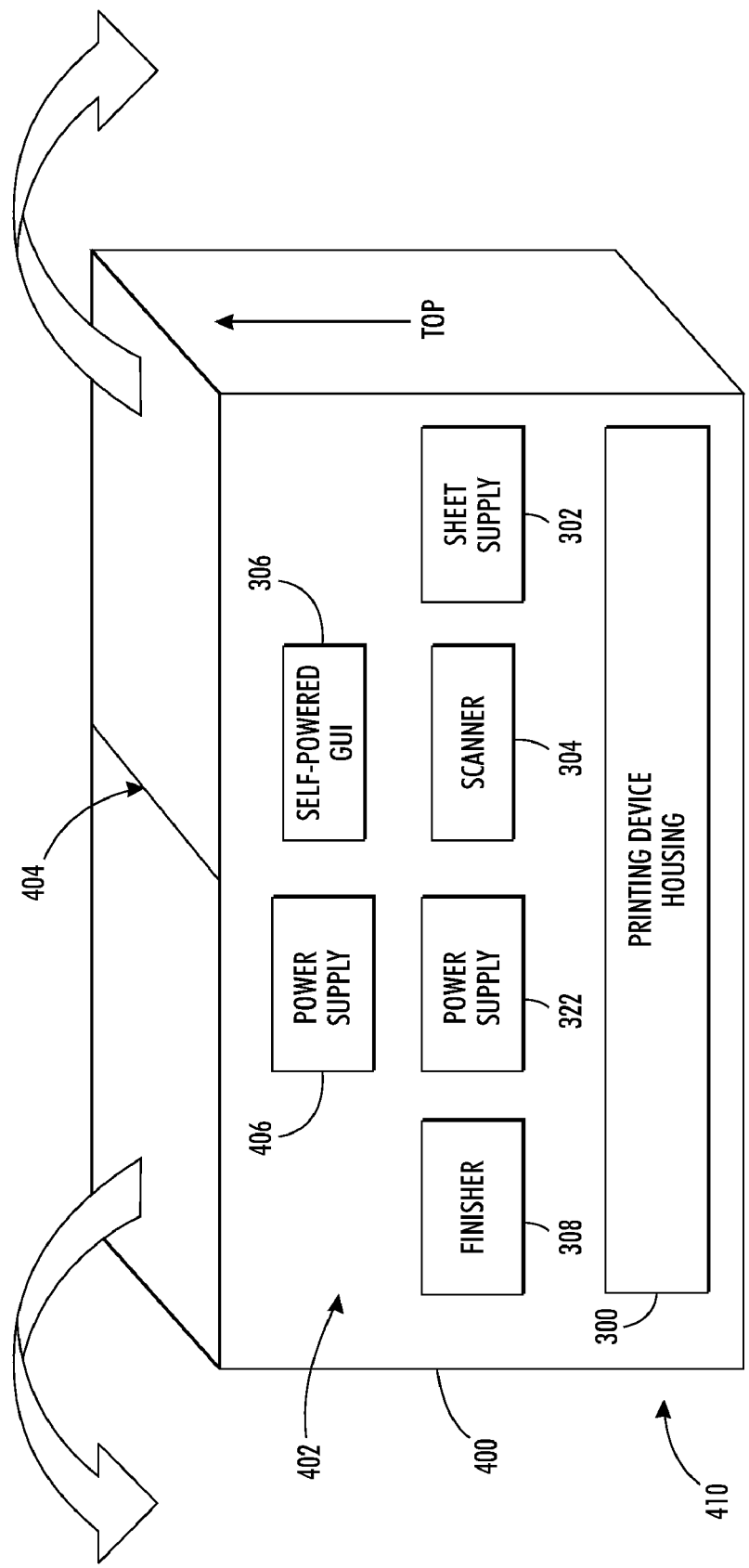
FIG. 4 is a side-view schematic diagram of a device within a container according to embodiments herein.

As shown in FIG. 4, further embodiments herein include a container 410 that comprises a sealed outer package 400 having a top 404 that can be opened. Protective packaging materials 402 are maintained within the sealed outer package 400. FIG. 4 illustrates the multi-function printing device from FIG. 3 within the sealed outer package 400; however, one ordinarily skilled in the art would understand that any device, such as the device shown in FIG. 1, could be included within the container 410.

The housing 300 that is mentioned above is positioned within the protective packaging materials, as is at least one of the functional component (302, 304, 308, 310, 312, 314, 320, 322, 324, 326, etc.). The protective packaging materials 402 help prevent the housing 300 and functional components from being damaged during shipment of the container 410. Again, the functional components operate on power from an external power source 128 after being removed from the sealed outer package 400. The functional components are connectable to the housing 300 after being removed from the sealed outer package 400.

In addition, the self-powered graphic user interface assembly 306 and optional printed instructions 406 are positioned adjacent the openable top 404 of the sealed outer package 400 (also within the protective packaging materials 402) such that the self-powered graphic user interface assembly 306 (and optional printed instructions 406) are the first items to be removed from the openable top of the sealed outer package. The exterior of the sealed outer package 400 could contain instructions/markings that encourage the user to open the openable top 404 as opposed to other portions of the sealed outer package 400. As in the previous embodiments, the self-powered graphic user interface assembly 306 is connectable to the housing 300 after it is removed from the sealed outer package 400, and the self-powered graphic user interface assembly 306 comprises a dedicated power supply 148 used exclusively by the self-powered graphic user interface assembly 306.

After being removed from the sealed outer package 400 and turned on by the user, the self-powered graphic user interface assembly 306 displays the video loop of instructions explaining how to remove the functional components from the sealed outer package 400 and how to connect the functional components and the self-powered graphic user interface assembly 306 to the housing 300 prior to when the functional components 302 are connected to the external power source 128.

One of the assembly steps displayed by the user interface assembly 306 is the step of connecting the housing 300 to an alternating current power supply 128, after which all the functional components and the user interface assembly 306 operate on power received from the power supply 104. Thus, the user interface assemblies 106 and 306 comprise permanent parts of the devices shown in FIGS. 1 and 3 and are not used just for assembly instructions. Once attached to the housing, the user interface assemblies are not removable, and become a permanent part of the housing.

The primary function of the user interface assemblies 106 and 103 is to act to allow the devices shown in FIGS. 1 and 3 to perform their normal operating functions and allow the users to communicate with the devices 100, 300. The embodiments herein have modified the standard graphic user interfaces into the graphic user interface assemblies 106, 306 discussed above with the addition of circuitry, memory, self-powered abilities, etc. Because the embodiments herein utilize a component that would already be included within the device, the embodiments herein only increase the cost of the device slightly; however, the embodiments herein provide a substantial benefit and cost saving with respect to the costs of assembly and insulation of the device. Further, the self-contained power supply 148 does not need to be expensive in that it only needs to power the graphic user interface assembly 106, 306, for a very limited period of time (only that necessary to perform the initial assembly) and after that may not be used again.

By leveraging the capabilities (such as the included self-powered graphic user interface) of a machine, the embodiments herein provide the user with assembly and installation instructions, taking the cost out of supporting time intensive and expensive activities in the field. In a changing global climate where companies need to be lean in order to compete, the embodiments herein reduce the cost of time intensive and expensive activities in the field by providing assembly instructions in a more intuitive, easier to access, and easier to understand format. Building on the excitement of the user receiving their new product, the embodiments herein link the initial opening of the packaging to a quick, simple and easy installation and thereby offer significant value to any business by removing the need to support activities that can be enabled in other ways.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. An apparatus comprising:
    a functional component operating on power from an external power source; and
    a graphic user interface assembly operatively connected to said functional component,
    said graphic user interface assembly comprising:
        logic circuitry;
        a display screen operatively connected to said logic circuitry;
        at least one input device operatively connected to said logic circuitry;
        computerized memory storage operatively connected to said logic circuitry; and
        a dedicated power supply used exclusively by said graphic user interface assembly.

2. The apparatus according to claim 1, said dedicated power supply being adapted to provide power to said graphic user interface while said functional component is disconnected from said external power source.

3. The apparatus according to claim 1, said graphic user interface assembly comprising a housing,
    said logic circuitry, said display screen, said input device, said computerized memory storage, and said dedicated power supply being maintained within or on said housing.

4. The apparatus according to claim 1, said external power source comprising an alternating current power supply, said dedicated power supply comprising direct current power supply.

5. The apparatus according to claim 1, said computerized memory storage maintaining instructions for assembling said apparatus that are displayed on said display screen when said graphic user interface assembly is powered by said dedicated power supply.

6. An apparatus comprising:
    a housing;
    at least one functional component operating on power from an external power source, said functional component being connectable to said housing; and
    a graphic user interface assembly being connectable to said housing,
    said graphic user interface assembly comprising a dedicated power supply used exclusively by said graphic user interface assembly, and said graphic user interface assembly displaying instructions explaining how to connect said functional component and said graphic user interface assembly to said housing prior to said functional component being connected to said external power source.

7. The apparatus according to claim 6, said dedicated power supply being adapted to provide power to said graphic user interface while said functional component is disconnected from said external power source.

8. The apparatus according to claim 6, said graphic user interface assembly comprising a graphic user interface assembly housing, said dedicated power supply being maintained within or on said graphic user interface assembly housing.

9. The apparatus according to claim 6, said external power source comprising an alternating current power supply, said dedicated power supply comprising direct current power supply.

10. The apparatus according to claim 6, said graphic user interface assembly comprising a display screen and a computerized memory storage maintaining instructions for assembling said apparatus that are displayed on said display screen when said graphic user interface assembly is powered by said dedicated power supply.

11. A multi-function printing device comprising:
    a printer body housing comprising at least one printing engine operating on an external power source;
    at least one accessory component operating on said power from said external power source, said accessory component being connectable to said printer body housing; and
    a graphic user interface assembly being connectable to said printer body housing,
    said graphic user interface assembly comprising a dedicated battery used exclusively by said graphic user interface assembly, and said graphic user interface assembly displaying instructions explaining how to connect said accessory component and said graphic user interface assembly to said printer body housing prior to said accessory component being connected to said external power source.

12. The multi-function printing device according to claim 11, said dedicated battery being adapted to provide power to said graphic user interface while said accessory component is disconnected from said external power source.

13. The multi-function printing device according to claim 11, said graphic user interface assembly comprising a graphic user interface assembly printer body housing, said dedicated battery being maintained within or on said graphic user interface assembly printer body housing.

14. The multi-function printing device according to claim 11, said external power source comprising an alternating current power supply, said dedicated battery comprising direct current power supply.

15. The multi-function printing device according to claim 11, said graphic user interface assembly comprising a computerized memory storage maintaining instructions for assembling said apparatus that are displayed on said display screen when said graphic user interface assembly is powered by said dedicated battery.

16. A container comprising:
    a sealed outer package having an openable top;
    protective packaging materials within said sealed outer package;
    a housing positioned within said protective packaging materials;
    at least one functional component within said protective packaging materials, said functional component operating on power from an external power source after being removed from said sealed outer package, said functional component being connectable to said housing after being removed from said sealed outer package; and
    a graphic user interface assembly positioned adjacent said openable top of said sealed outer package within said protective packaging materials such that said graphic user interface is a first item to be removed from said openable top of said sealed outer package,
    said graphic user interface being connectable to said housing after being removed from said sealed outer package, said graphic user interface assembly comprising a dedicated power supply used exclusively by said graphic user interface assembly, and after being removed from said sealed outer package, said graphic user interface assembly displaying instructions explaining how to remove said functional component from said sealed outer package and how to connect said functional component and said graphic user interface assembly to said housing prior to said functional component being connected to said external power source.

17. The container according to claim 16, said dedicated power supply being adapted to provide power to said graphic user interface while said functional component is disconnected from said external power source.

18. The container according to claim 16, said graphic user interface assembly comprising a graphic user interface assembly housing, said dedicated power supply being maintained within or on said graphic user interface assembly housing.

19. The container according to claim 16, said external power source comprising an alternating current power supply, said dedicated power supply comprising direct current power supply.

20. The container according to claim 16, said graphic user interface assembly comprising a computerized memory storage maintaining instructions for assembling said apparatus that are displayed on said display screen when said graphic user interface assembly is powered by said dedicated power supply.

* * * * *